Patented June 24, 1930

1,766,344

UNITED STATES PATENT OFFICE

RICHARD MICHEL, OF KREFELD, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CONDENSATION PRODUCTS OF HYDROGENATED NAPHTHALENES WITH ETHYLENE

No Drawing. Application filed April 7, 1928, Serial No. 268,363, and in Germany February 4, 1926.

The present invention concerns the manufacture of condensation products from hydrogenated naphthalenes and derivatives thereof with ethylene and consists in causing ethylene to interact with partially hydrogenated naphthalenes or their derivatives in the presence of catalytically active substances at temperatures between 50 and 200° C. and under superatmospheric pressure.

According to the present invention ethylene can be readily introduced into the naphthalene nucleus by causing the reaction to take place in the presence of catalytically acting substances at temperatures between 50 and 200° C. under superatmospheric pressure. As catalytic substances metallic chlorides, by preference aluminium chloride and iron chloride are employed. They may advantageously be combined with other substances promoting the ease of reaction, such as benzene, hydrocarbons or halogen acids.

According to the operative conditions mono- or poly-ethylated partially hydrogenated naphthalenes, or by more intensified action, condensation products in the form of highly viscous, strongly fluorescent oils, are obtained. The process can also be adapted to partially hydrogenated naphthalenes, which are variously substituted.

The following example serves to illustrate the principles underlying my invention, which as already stated can be carried out within wide limits:

*Example:* In an autoclave of 300 litres capacity 132 kgs. of tetrahydronaphthalene and 2 kgs. of aluminium chloride are stirred for some 4 hours with ethylene under a pressure of 20 to 30 atmospheres and at about 100° C. The consumed ethylene is constantly replenished from a container under pressure until a total of 30 kgs. has been absorbed. After cooling the contents of the autoclave and removing aluminium chloride, distillation is effected, preferably in vacuo. The first fractions contain 10 kgs. of unchanged tetrahydronaphthalene, then 146 kgs. of oily product go over (b. p. 145 to 200° C. at 20 mm. pressure), while 5 kgs. of an undistillable residue remain.

The oily portion boils under normal pressure from 240 to 340° C. Instead of aluminium chloride, iron chloride and other metallic chlorides of that kind may be used with similar effect.

This application is a continuation-in-part of my co-pending application Ser. No. 163,578, filed January 25, 1927.

In the following claims the term "partially hydrogenated naphthalene compound" is intended to comprise the partial hydrogenation products of naphthalene, or of its homologues or substitution products.

I claim:

1. Process, which comprises reacting with ethylene upon a partially hydrogenated naphthalene compound in the presence of a catalytically acting metallic halide, under conditions of elevated temperature above 50° C. and super-atmospheric pressure.

2. Process, which comprises reacting with ethylene upon a partially hydrogenated naphthalene compound in the presence of a catalytically acting metallic chloride under superatmospheric pressure and at temperatures from about 50° C. to about 200° C.

3. Process, which comprises reacting with ethylene upon a partially hydrogenated naphthalene compound in the presence of a catalytically acting metallic chloride under superatmospheric pressure and at a temperature of about 100° C.

4. Process, which comprises reacting with ethylene upon tetrahydronaphthalene in the presence of a catalytically acting metallic chloride under a pressure of from 20 to 30 atmospheres and at a temperature of about 100° C.

5. Process, which comprises reacting with ethylene upon tetrahydronaphthalene in the presence of aluminium chloride under a pressure of from 20 to 30 atmospheres and at a temperature of about 100° C.

In testimony whereof I have hereunto set my hand.

RICHARD MICHEL.